United States Patent [19]

Okazaki et al.

[11] Patent Number: 4,818,618

[45] Date of Patent: Apr. 4, 1989

[54] ALUMINUM MATERIAL COATED WITH FLUORINE RESIN

[75] Inventors: Hiroshi Okazaki; Fumio Matsuyama; Seiji Watabe, all of Osaka, Japan

[73] Assignee: Sumitomo Electric Industries, Ltd., Osaka, Japan

[21] Appl. No.: 27,925

[22] Filed: Mar. 19, 1987

[30] Foreign Application Priority Data

Mar. 19, 1986 [JP] Japan .................................. 61-62782

[51] Int. Cl.[4] ......................... B32B 27/06; B32B 15/08

[52] U.S. Cl. .................................... 428/421; 428/422; 428/463

[58] Field of Search ......................... 428/422, 463, 461

[56] References Cited

U.S. PATENT DOCUMENTS

| | | | |
|---|---|---|---|
| 4,600,651 | 7/1986 | Aufdermarsh et al. | 428/463 X |
| 4,605,695 | 8/1986 | Sakamaki et al. | 428/463 X |

FOREIGN PATENT DOCUMENTS

| | | | |
|---|---|---|---|
| 735854 | 8/1955 | United Kingdom | 428/461 |
| 740248 | 11/1955 | United Kingdom | 428/461 |
| 1184561 | 3/1970 | United Kingdom | 428/422 |

*Primary Examiner*—Thomas J. Herbert
*Attorney, Agent, or Firm*—Sughrue, Mion, Zinn, Macpeak, and Seas

[57] ABSTRACT

A fluorine resin coated aluminum material which is prepared by a process comprising the steps of coating a fluorine resin on an aluminum material having a magnesium content of from 0.01 to 10.0 wt %, and sintering the coated resin at a temperature not lower than the decomposition point of said fluorine resin.

10 Claims, 1 Drawing Sheet

ALUMINUM MATERIAL COATED WITH FLUORINE RESIN

FIELD OF THE INVENTION

The present invention relates to an aluminum material having a coating of fluorine resin.

BACKGROUND OF THE INVENTION

Fluorine resins such as polytetrafluoroethylene (hereinafter abbreviated as PTFE) are plastics having superior anti-sticking, heat resistant, chemical resistant, and electrical insulating properties and, making use of these advantages, articles shaped from metals having PTFE coatings are widely used in home kitchenware and in industrial parts such as fixing rollers of copying machines.

However, fluorine resins typified by PTFE and tetrafluoroethylene/hexafluoropropylene copolymer have the disadvantage that their adhesion to metals is very poor, and special methods are required to achieve bonding between fluorine resins and metals. The methods conventionally employed in bonding fluorine resins to metal substrates are roughly classified into two types, i.e., chemical and mechanical methods, in accordance with the mechanism of bonding. A typical example of the former method is primer coating and the latter method is typified by etching.

In the primer coating process, the surface of a metal of interest is roughened by a suitable method such as sand blasting and is then coated with a primer (i.e., adhesive layer), which is in turn coated with a fluorine resin layer. In other words, the metal is bonded to the resin with the aid of an intervening primer.

In the etching process, the surface of a metal substrate, say aluminum, is etched either electrochemically or chemically to produce fine asperity on the surface, which then is coated with a fluorine resin. In the etching method, aluminum is bonded to the resin by an anchor effect provided by the etching.

Of these two methods, the etching process is superior because it achieves stronger adhesion between metals and fluorine resins, and if fluorine resins are coated onto flat metal sheets, they can be formed into a desired shape.

However, the conventional methods of bonding fluorine resins to aluminum have an economic disadvantage in that in addition to the steps of coating and sintering the resin, an additional step (i.e., the step of applying a primer coating in the primer coating process, and the step of roughening the surface of aluminum in the etching process) are required. Another problem with the conventional bonding techniques is that it is very difficult to provide equipment adapted to the bonding of a fluorine resin onto a thin aluminum sheet in view of the requirement of roughening its surface by etching, sand blasting, or other appropriate method.

SUMMARY OF THE INVENTION

In order to solve the aforementioned problems, the present inventors have conducted studies and a series of experiments for developing a method for bonding fluorine resins to aluminum without depending upon the conventional processes.

As a result, the inventors have accomplished the present invention, which provides a fluorine resin coated aluminum material which is prepared by a process comprising the steps of coating a fluorine resin on an aluminum material having a magnesium content of from 0.01 to 10.0 wt %, and sintering the coated resin at a temperature not lower than the decomposition point of the fluorine resin.

DETAILED DESCRIPTION OF THE INVENTION

Figure 1:
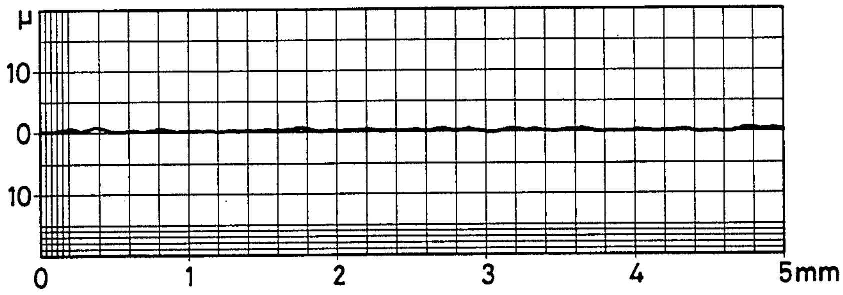
FIG. 1 shows the surface roughness profile of the coated side of the product prepared in Sample No. 1-4.

The accomplishment of the present invention is based on the finding by the inventors of the fact that by sinterig an applied fluorine resin layer at a temperature higher than that commonly employed in the sintering of fluorine resins, adhesion which is quite satisfactory for practical purposes can be attained between the resin layer and aluminum without applying any primer coat or etching the aluminum surface.

If the aluminum material used as a substrate in the present invention has a magnesium content of less than 0.01 wt %, satisfactory adhesion between a fluorine resin and aluminum is not attained and the resulting product is not serviceable, because it will experience problem such as the separation of the fluorine resin layer from the substrate. If the magnesium content of the aluminum material exceeds 10.0 wt %, the flowability of aluminum is impaired to cause casting defects that will lead to problems in subsequent manufacturing operations. Furthermore, excess magnesium will form compounds with other metals to yield a brittle product that is less adapted to machining. Therefore, in order to obtain satisfactory adhesion between a fluorine resin and aluminum, the magnesium content of the aluminum material is in the range of from 0.01 to 10.0 wt %, and preferably is in the range of from 0.1 to 10.0 wt %.

The decomposition point of a fluorine resin is the temperature at which the resin starts to depolymerize by the action of heat, and is usually determined by thermogravimetric analysis. For instance, PTFE being heated in an atmosphere more than about 380° C. is gradually decomposed (P. E. Thomas, *Soc. Plastics Eng. J.*, Vol. 12, 89 (56)) and, by monitoring the decrease in its weight by thermogravimetry, its decomposition point, or the temperature at which PTFE starts to be decomposed can be determined. The rate of reduction in weight varies with the heating temperature and time. The decomposition points of PFA (tetrafluoroethylene/perfluoroalkylvinylether copolymer) and FEP (tetrafluoroethylene/hexafluoropropylene copolymer) are equal to or lower than that of PTFE.

An important aspect of the present invention is the discovery by the inventors of the fact that by sintering a fluorine resin under conditions of temperature and time that cause the resin to be slightly decomposed, the resin adheres satisfactorily to magnesium-containing aluminum. The sintering conditions that cause slight decomposition of a fluorine resin are determined by the sintering temperature and time. Conventionally, fluorine resins used as coating materials have been found to be sintered at temperature of from 350° to 380° C. which are not lower than the melting points of the resins and for a period of time ranging about from 10 to 40 minutes. It is essential for the purpose of the present invention that the fluorine resins be sintered at a temperature higher than these. For instance, PTFE is preferably sintered at a temperature of 400° C. or higher, more preferably, it is sintered at a temperature of from 400° to 600° C., for a period of from 10 to 200 seconds. The sintering time should be prolonged on the lower temperature side of this range, and vice versa. Under these sintering conditions, only a part of the heated resin is decomposed and it will retain tensile strength and elongation that are satisfactory for practical purposes.

Of the fluorine resins mentioned above, PTFE is most preferably used since it displays the best properties in such respects as heat resistance and anti-stickiness.

The advantages of the present invention become more apparent when the present invention is applied to the coating of a fluorine resin onto a thin sheet of aluminum which is difficult to etch or blast with conventional equipment. The present invention provides an effective method for coating fluorine resins on aluminum foils which generally are as thin as 200 micrometers or less.

The present invention has the additional advantage that the substrate does not need to be subjected to etching, sand blasting or other surface preparations, and a coating having satisfactorily strong adhesion can be provided even if the aluminum material has a smooth surface. Because of this advantage, the present invention enables the production of a product having a highly smooth coated surface. To this end, the aluminum substrate preferably has a surface roughness Rz (according to JIS B0601) of no more than 5 micrometers, which ensures the production of a smooth-surfaced coating which has an Rz value of 3 micrometers or less.

The following examples are provided for the purpose of further illustrating the present invention but should in no sense be taken as limiting.

EXAMPLE 1

A 80 micrometers thick aluminum sheet (type 3004) with a magnesium content of 0.8 wt % was flow-coated with a PTFE dispersion. The assembly was dehydrated by heating at 80° C. for 3 minutes, and further heated to 250° C. to remove the surfactant. Thereafter, the assembly was sintered under the conditions of temperature and period of time shown in Table 1. As a result, PTFE coatings with a thickness of 15 micrometers were formed on the aluminum sheet.

The thus prepared samples were subjected to a cross-cut peeling test in which using a sharp-edged knife to make a cross-cut pattern consisting of a hundred (10×10) 1 mm squares was cut into the resin coating to reach the substrate, applying Cellotape (an adhesive tape) over the cross-cut area, and immediately peeling the tape off. The adhesion between the resin and the substrate was evaluated in terms of the number of squares which remained intact in the cross-cut area. In another test, the substrate aluminum was etohed away with HCl and the remaining PTFE coating was checked for its tensile strength and elongation, using a sample having a size of 10 mm×150 mm, and a distance between the chucks of 50 mm, at a tensile speed of 100 mm/min. The results are shown in Table 1.

TABLE 1

| Sample No. | Sintering Temperature (°C.) | Sintering Time (sec) | Result of Cross-cut Peeling Test* | Tensile Strength of PTFE Coating ($kg/mm^2$) | Elongation of PTFE Coating (%) |
|---|---|---|---|---|---|
| 1-1 | 380 | 30 | 0/100 | 0.7 | 180 |
| 1-2 | 400 | 30 | 30/100 | 1.4 | 360 |
| 1-3 | 450 | 30 | 80/100 | 1.7 | 420 |
| 1-4 | 500 | 30 | 100/100 | 1.5 | 250 |
| 1-5 | 530 | 30 | 100/100 | 1.5 | 180 |
| 1-6 | 550 | 30 | 100/100 | 1.5 | 120 |
| 1-7 | 600 | 30 | 100/100 | 1.2 | 80 |
| 1-8 | 630 | 20 | 90/100 | 1.0 | 80 |
| 1-9 | 700 | 15 | 80/100 | 0.5 | 50 |
| 1-10 | 800 | 5 | 85/100 | 0.3 | 40 |

$* \frac{\text{Number of remaining squares}}{100}$

Note: Sample No. 1-1 is a comparative sample, and Sample Nos. 1-2 to 1-10 are samples according to the present invention.

Sample No. 1-1 using a sintering temperature of 380° C. did not show satisfactory adhesion between the aluminum substrate and the PTFE coating. Satisfactory adhesion was attainable by heating with very high sintering temperatures, but, on the other hand, the thermal decomposition of PTFE became so pronounced as to lower the mechanical strength of the PTFE coating (Sample Nos. 1-9 and 1-10). Therefore, an appropriate selection of sintering temperature and holding time is necessary to attain an optimum balance between the mechanical properties (i.e., tensile strength and elongation) of the PTFE coating and its adhesion to the aluminum substrate.

EXAMPLE 2

Comparisons in performance of products using Mg-free aluminum as the substrate and products using Mg-containing aluminum alloys were made.

Each of aluminum alloy substrates having alloy compositions shown in Table 2 was flow-coated with a PTFE dispersion. In Table 2, the balance of aluminum in the alloy compositions is omitted. The assembly was dehydrated by heating at 80° C. for 3 minutes, and further heated to 250° C. in order to remove the surfactant. The assembly was then sintered at 500° C. for 1 minute. As a result, PTFE coatings having a thickness of aobut 15 micrometers were formed. The adhesion between the resin layer and the aluminum substrate in each sample was evaluated by the cross-cut peeling test as in Example 1 and by measuring the peeling strength of the resin coat. The results are shown in Table 2.

TABLE 2

| Sample No. | Alloy Composition (wt %) Si | Fe | Mn | Mg | Result of Cross-cut Peeling Test* | Peeling Strength (kg/cm) |
|---|---|---|---|---|---|---|
| 2-1 | 0.271 | 0.40 | 0.91 | 1.10 | 100/100 | 1.20 |
| 2-2 | 0.25 | 0.20 | 0.05 | 0.15 | 100/100 | 0.65 |
| 2-3 | 0.173 | 0.57 | 0.75 | 0.82 | 100/100 | 0.90 |
| 2-4 | 0.21 | 0.32 | 0.006 | 2.40 | 100/100 | 0.70 |
| 2-5 | 0.30 | 0.40 | 0.05 | 4.80 | 100/100 | 0.95 |
| 2-6 | 0.156 | 0.53 | 0.006 | 0.01 | 80/100 | 0.45 |
| 2-7 | 0.25 | 0.40 | 0.05 | 0.05 | 90/100 | 0.55 |
| 2-8 | 0.30 | 0.40 | 0.10 | 5.60 | 100/100 | 1.10 |
| 2-9 | 0.065 | 0.14 | <0.005 | <0.001 | 0/100 | 0.09 |
| 2-10 | 0.156 | 0.53 | 0.006 | 0.002 | 0/100 | 0.04 |
| 2-11 | 0.116 | 0.40 | <0.005 | <0.001 | 0/100 | 0.13 |
| 2-12 | 0.276 | 0.56 | 1.00 | 0.003 | 0/100 | 0.21 |

$* \frac{\text{Number of remaining squares}}{100}$

Note: Sample Nos. 2-9 to 2-12 are comparative samples, and Sample Nos. 2-1 to 2-8 are samples according to the present invention.

As shown in the above, when an aluminum alloy having a magnesium content of from 0.01 to 10 wt % is used as a substrate, adhesion that between PTFE and the substrate is satisfactory for practical purpose.

EXAMPLE 3

The procedures in Example 1 were repeated except that PTFE was replaced by two other fluorine resins, viz., PFA and FEP that were noted above. Aluminum substrates, having a thickness of 80 micrometers and a magnesium content of 0.8 wt % were flow-coated with a dispersion of PFA (Sample No. 3-1) or FEP (Sample No. 3-2).

Each of the assemblies was dehydrated by heating at 80° C. for 3 minutes and further heated at 250° C. to remove the surfactant. Thereafter, the assemblies were sintered under the conditions of temperature and time shown in Table 3. As a result, PFA and FEP coatings with a thickness of 15 micrometers were formed.

The adhesion between the resin coating and the substrate in each sample was evaluated by the cross-cut peeling test as in Example 1. In a separate test, the aluminum substrate was etched away with HCl and the remaining PFA or FEP coating was checked for its tensile strength and elongation in the same manner as in Example 1. The results are shown in Table 3.

TABLE 3

| Sample No. | Sintering Temp- ature (°C.) | Sintering Time (sec) | Result of Cross-cut Peeling Test* | Tensile Strength of Resin Coating (kg/mm$^2$) | Elongation of Resin Coating (%) |
|---|---|---|---|---|---|
| 3-1 | 450 | 60 | 100/100 | 0.8 | 200 |
| 3-2 | 480 | 60 | 100/100 | 0.6 | 160 |

* $\frac{\text{Number of remaining squares}}{100}$

As shown in Table 3, when fluorine resins other than PTFE are used, the present invention also attains good adhesion between the resin coating and substrates.

EXAMPLE 4

Experiments were conducted in order to compare the performance of a PTFE-coated product prepared in accordance with the present invention with the performance of the products prepared by two conventional methods, viz., the etching process and the primer coating process.

The sample according to the present invention was prepared in the same manner as in Example 1-4. A comparative PTFE-coated aluminum sheet was prepared by the etching process (Sample No. 4-1) and another comparative sample was prepared by the primer coating process (Sample No. 4-2). More specifically, the two comparative samples were prepared according to the following procedures.

Sample 4-1

An aluminum sheet having a thickness of 0.1 mm was electrochemically etched at a current density of 20 coulombs/cm$^2$ in 5% aqueous solution of NaCl so as to produce fine asperity on the aluminum surface. The roughened surface of the aluminum sheet was coated with a PTFE dispersion. After dehydration, the assembly was sintered at 380° C. for 20 minutes to provide a PTFE-coated aluminum sheet.

Sample 4-2

An aluminum sheet having a thickness of 0.1 mm was sand-blasted and coated with a PTFE primer dispersion. After dehydration, the assembly was heated at 200° C. for 10 minutes to sinter the primer coating, and then a PTFE dispersion was coated on the primer coating (top coating). Therefore, the assembly was dehydrated, and sintered at 380° C. for 20 minutes.

The samples Nos. 1-4, 4-1 and 4-2 were evaluated for their surface roughness and antisticking properties. Surface roughness measurement was conducted by determining the ten-points average roughness Rz as defined in JIS B 0601. Upon measuring the surface roughness, the reference lengths of 0.25 mm, 0.8 mm, and 2.5 mm are used for the sample Nos. 1-4, 4-1, and 4-2, respectively. Evaluation of nonsticking property was conducted as follows: a stainless steel ring (having an inner diameter of 1 inch) was placed on the coated surface of the sample; sugar was put into the ring and melted with heat; after cooling, the ring was pulled along the coated surface and the force with which it had to be pulled in order to detach the solidified sugar from the coated surface was measured. The results are summarized in Table 4.

TABLE 4

| Sample No. | Surface roughness (micrometer) | Antisticking property (kg) |
|---|---|---|
| 1-4 | 0.5 | 0.3 |
| 4-1 | 5.5 | 3.5 |
| 4-2 | 16 | 8.5 |

Figure 2:
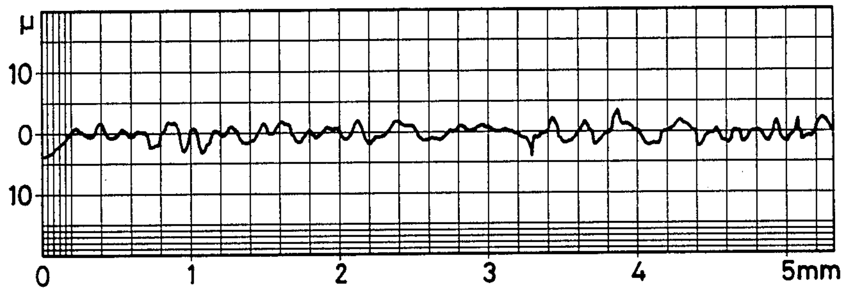
FIGS. 2 and 3 show the surface roughness profiles of the coated sides of the products prepared in Sample Nos. 4-1 and 4-2, respectively.
Figure 3:
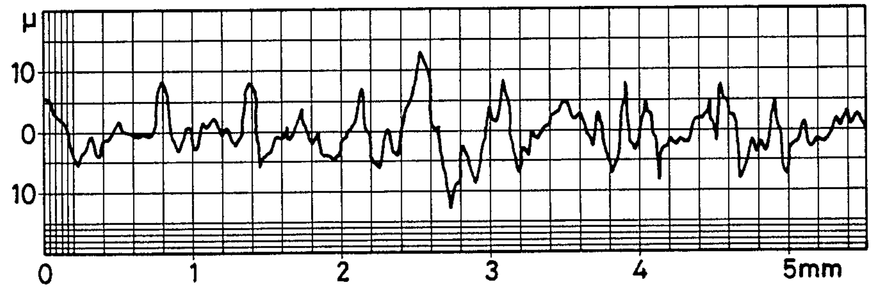

FIG. 1 shows the surface roughness profile of the coated surface of Sample No. 1-4; FIGS. 2 and 3 show the surface roughness profiles of the coated surfaces of Sample No. 4-1 using the etching process and Sample No. 4-2 by using the primer-coating process. In each Figure, the minimum scale of vertical and horizontal axes is 1 micrometer; the vertical scale is shown at a magnification of 1:1000 and the horizontal scale at one of 1:25.

From the results shown in Table 4 and FIGS. 1 to 3, fluorine resin-coated aluminum materials having a particularly smooth coated surface and an excellent antisticking property can be obtained by the present invention without deterioration of adhesion between the resin and the substrate.

As will be understood from the forgoing description, the present invention enables an aluminum material to be coated with a fluorine resin layer having satisfactory adhesion to the aluminum material substrate without processing the surface thereof by a roughening adhesion to substrates without processing the surface thereof by a roughening technique such as etching or sand blasting. In addition, it is capable of providing a fluorine resin coating having satisfactory adhesion to a smooth-surfaced aluminum substrate without employing any bonding step as has been necessary in the primer coating process. As a result, the present invention ensures the production of a product having a highly smooth-surfaced resin coating on an aluminum substrate.

Because of these advantages, the present invention is very fields where antisticking properties are strongly desired, such as food containers, kitchenware and machine parts. Particular advantage can be obtained when the invention is applied to the manufacture of food containers.

While the invention has been described in detail and with reference to specific examples thereof, it will be apparent to one skilled in the art that various changes and modifications can be made therein without departing from the spirit and scope thereof.

What is claimed is:

1. A fluorine resin coated aluminum material which is prepared by a process consisting essentially of the steps of coating a fluorine resin on an aluminum material having a magnesium content of from 0.01 to 10.0 wt %, and sintering the coated resin at a temperature not lower than the decomposition point of said fluorine resin.

2. A fluorine resin coated aluminum material as in claim 1, wherein said aluminum material has a magnesium content of from 0.1 to 10.0 wt %.

3. A fluorine resin coated aluminum material as in claim 1, wherein said fluorine resin is a tetrafluoroethylene/perfluoroalkylvinylether copolymer.

4. A fluorine resin coated aluminum material as in claim 1, wherein said fluorine resin is a tetrafluoroethylene/hexafluoropropylene copolymer.

5. A fluorine resin coated aluminum material as in claim 1, wherein said aluminum material is in the form of a foil having a thickness of 200 micrometers or less.

6. A fluorine resin coated aluminum material as in claim 1, wherein said aluminum material has a surface roughness Rz of 5 micrometers or less.

7. A fluorine resin coated aluminum material as in claim 1, wherein said fluorine resin has a thickness of 20 micrometers or less and the surface roughness Rz of said fluorine resin is 3 micrometers or less.

8. A fluorine resin coated aluminum material as in claim 1, wherein said fluorine resin is polytetrafluoroethylene.

9. A fluorine resin coated aluminum material as in claim 8, wherein said polytetrafluoroethylene is sintered at a temperature of 400° C. or higher for a period of from 10 to 200 seconds.

10. A fluorine resin coated aluminum material as in claim 9, wherein said polytetrafluoroethylene is sintered at a temperature of from 400° to 600° C. for a period of from 10 to 200 seconds.

* * * * *